US007532982B2

(12) United States Patent
Inoue

(10) Patent No.: US 7,532,982 B2
(45) Date of Patent: May 12, 2009

(54) FREEZE FORECASTING DEVICE FOR HOT WATER HEATING APPARATUS AND HOT WATER HEATING APPARATUS

(75) Inventor: Tomoo Inoue, Nagoya-shi (JP)

(73) Assignee: Rinnai Corporation, Nagoya-shi (JP)

( * ) Notice: Subject to any disclaimer, the term of this patent is extended or adjusted under 35 U.S.C. 154(b) by 102 days.

(21) Appl. No.: 11/829,162

(22) Filed: Jul. 27, 2007

(65) Prior Publication Data
US 2008/0033651 A1    Feb. 7, 2008

(30) Foreign Application Priority Data
Aug. 4, 2006    (JP)    ............................. 2006-212857

(51) Int. Cl.
*G01W 1/02*    (2006.01)
(52) U.S. Cl. ........................................................ 702/3
(58) Field of Classification Search .................... 702/3, 702/12, 57, 79, 89, 99, 104, 130–132, 136, 702/177–181, 184, 188; 137/62, 301
See application file for complete search history.

(56) References Cited
U.S. PATENT DOCUMENTS
5,203,500 A * 4/1993 Horne, Sr. .................... 237/19
6,021,798 A * 2/2000 Martin .......................... 137/62
7,089,955 B1 * 8/2006 Komro, Sr. .................. 137/301

FOREIGN PATENT DOCUMENTS
JP    63-213744    9/1988
JP    04-000150    1/1992
JP    10-160176    6/1998

* cited by examiner

*Primary Examiner*—Edward Raymond
*Assistant Examiner*—Mohamed Charioui
(74) *Attorney, Agent, or Firm*—Amin, Turocy & Calvin, LLP

(57) ABSTRACT

A freeze forecasting device for a hot water heating apparatus, for forecasting a possibility of freeze of water in a water passage circuit due to reduction in outside air temperature at a forecast target time on a forecast target day. The device includes a clock portion; an outside air temperature sensor; an outside air temperature history storage portion; a retrieval portion for retrieving a past outside air temperature; and a forecasting portion for determining whether the retrieved past outside air temperature is not higher than a freezing critical temperature of the water in the water passage circuit and forecasting the possibility of freeze of the water in the water passage circuit at the forecast target time on the forecast target day.

9 Claims, 6 Drawing Sheets

| Time zone | Jan/01/'02, 00:00 ~ Jan/01/'02, 06:00 | Jan/01/'02, 06:00 ~ Jan/01/'02, 12:00 | Jan/01/'02, 12:00 ~ Jan/01/'02, 18:00 | Jan/01/'02, 18:00 ~ Jan/02/'02, 00:00 | Jan/02/'02, 00:00 ~ Jan/02/'02, 06:00 | ... |
|---|---|---|---|---|---|---|
| Reference time X(J,1) X(L,1) | 2002010106 | 2002010112 | 2002010118 | 2002010200 | 2002010206 | ... |
| Temperature (°C) X(J,2) X(L,2) | −3 | −2 | 2 | −1 | −2 | ... |

X(J,K)

| Dec/31/'05, 00:00 ~ Dec/31/'05, 06:00 | Dec/31/'05, 06:00 ~ Dec/31/'05, 12:00 | Dec/31/'05, 12:00 ~ Dec/31/'05, 18:00 | Dec/31/'05, 18:00 ~ Jan/01/'06, 00:00 | ... |
|---|---|---|---|---|
| 2005123106 | 2005123112 | 2005123118 | 2006010100 | ... |
| −3 | 1 | 1 | −2 | ... |

FREEZE FORECASTING DEVICE FOR HOT WATER HEATING APPARATUS AND HOT WATER HEATING APPARATUS

BACKGROUND OF THE INVENTION

1. Field of the Invention

The present invention relates to a freeze forecasting device for a hot water heating apparatus, for forecasting freeze of water in a water passage circuit. More specifically, the present invention relates to the freeze forecasting device for forecasting a possibility of freeze of water in a water passage circuit of a hot water heating apparatus such as a bath reheating apparatus, a water heater, a hot water heating system, and the like.

2. Description of the Related Art

As a bath reheating apparatus, there is a widely known reheating apparatus in which a heat exchanger heated by a gas burner and a bathtub are connected by a reheating circuit in a closed loop form and a forced-circulation pump is disposed in the reheating circuit. Moreover, as this type of reheating apparatus, there is a known reheating apparatus mounted with an outside air temperature sensor for preventing freeze, because there is a fear that water in the reheating circuit freezes as outside air temperature drops during shutdown in winter.

In this reheating apparatus, if the gas burner is turned on to actuate the forced-circulation pump, bath water in the bathtub is heated by the heat exchanger while circulating through the reheating circuit in the closed loop form to be thereby reheated.

Furthermore, there is a known reheating apparatus in which when an outside air temperature sensor detects that an outside air temperature has dropped to a freezing critical temperature in a state in which a bathtub is filled with water, a forced-circulation pump is operated intermittently to thereby prevent freeze of water in a reheating circuit in winter.

However, in each of the above-described conventional reheating apparatuses, because the forced-circulation pump is suddenly actuated to start the freeze preventing operation when the outside air temperature drops at cold midnight in winter, noise of the pump suddenly echoes in a room where a resident is fast asleep to thereby disturb him/her.

Although a problem of the bath reheating apparatus has been taken as an example, a circulation pump is also actuated during a freeze preventing operation in a hot water heating apparatus such as a hot water heating system in which hot water produced by heating by a heat exchanger is supplied to heating terminal equipment with the circulation pump. Therefore, this kind of hot water heating apparatus such as the hot water heating system also has the problem similar to the above.

SUMMARY OF THE INVENTION

The present invention has been made in view of the above, and it is an object of the present invention to provide a freeze forecasting device for a hot water heating apparatus, for forecasting a possibility of freeze of water in a water passage circuit in advance to thereby provide a hot water heating apparatus which does not give a residents a feeling of suddenness even if noise of a freeze preventing operation occurs.

According to one aspect of the present invention, there is provided a freeze forecasting device for a hot water heating apparatus, for forecasting a possibility of freeze of water in a water passage circuit due to reduction in outside air temperature at a forecast target time on a forecast target day, the device comprising:

a clock portion for automatically computing current year, month, day, and time;

an outside air temperature sensor;

an outside air temperature history storage portion for storing outside air temperatures for at least one year based on outputs from the clock portion and the outside air temperature sensor;

a retrieval portion for retrieving a past outside air temperature in a time zone including a time identical to the forecast target time in a past year, month, and day corresponding to the year, month, and day of the forecast target day or a day before or after the forecast target day, from the outside air temperature history storage portion; and a forecasting portion for determining whether the retrieved past outside air temperature is not higher than a freezing critical temperature of the water in the water passage circuit and forecasting the possibility of freeze of the water in the water passage circuit at the forecast target time on the forecast target day.

According to another aspect of the present invention, there is provided a hot water heating apparatus including the freeze forecasting device.

Other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 3 is a diagram of an outside air temperature table according to the embodiment of the present invention;

DETAILED DESCRIPTION OF THE PREFERRED EMBODIMENTS

Referring to drawings, the best mode for carrying out the present invention is described below.

(Hot Water Heating Apparatus)

Figure 1:
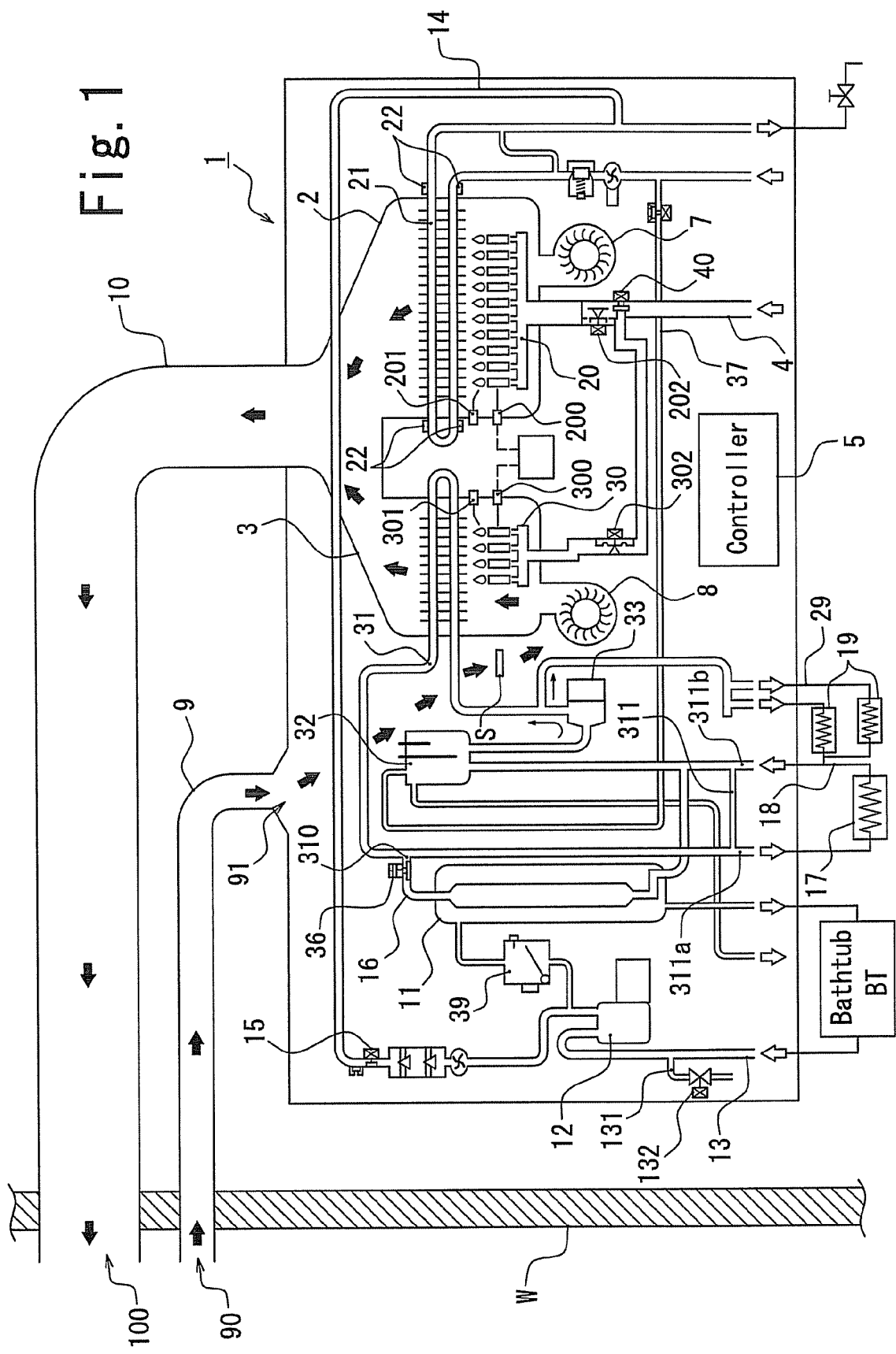
FIG. 1 is a schematic view of a hot water heating apparatus according to an embodiment of the present invention.

FIG. 1 is a schematic view of a hot water heating apparatus 1 including a freeze forecasting device according to an embodiment of the present invention. The hot water heating apparatus 1 includes a hot water heat exchanger 2 and a heating/reheating heat exchanger 3.

The hot water heat exchanger 2 and the heating/reheating heat exchanger 3 are configured to be separately heated by a hot water burner 20 and a heating/reheating burner 30 provided at a downstream end of a gas circuit 4. In vicinities of these burners 20, 30, ignition electrodes 200, 300 and flame detectors 201, 301 are provided. In branch circuits from a gas main valve 40 provided in the gas circuit 4 to the hot water burner 20 and the heating/reheating burner 30, gas proportional valves 202, 302 are disposed, respectively.

Through the heat exchangers 2, 3, parts of a hot water heating circuit 21 and a heating/reheating heating circuit 31 pass, respectively. A freeze preventing heater 22 is attached to the hot water heating circuit 21. Air supply fans 7, 8 for supplying air for combustion to the burners 20, 30 are provided at lower portions of the heat exchangers 2, 3.

An air supply duct 9 is connected to an upper portion of the hot water heating apparatus 1, and an air supply opening portion 90 at an upstream end of the duct 9 passes through a wall face W of a building to outside. Further, an outside air temperature sensor S is disposed in a path (susceptible to outside air) connecting a downstream end opening 91 of the air supply duct 9 and the air supply fan 8.

An exhaust duct 10 for leading combustion exhaust generated by the burners 20, 30 to outside is connected to upper portions of the heat exchangers 2, 3, and an exhaust opening portion 100 at a downstream end of the duct 10 passes through the wall face W of the building to outside.

In the hot water heating apparatus 1, air for combustion is taken into the heat exchangers 2, 3 from the air supply duct 9 with suction force of the air supply fans 7, 8. If the gas main valve 40 and the gas proportional valves 202, 302 are opened and the burners 20, 30 are ignited in this state, the burners 20, 30 start to burn and the combustion exhaust is discharged to outside through the exhaust duct 10. With this, the hot water heat exchanger 2 and the heating/reheating heat exchanger 3 are heated.

Next, a structure of the heating/reheating heating circuit 31 will be described.

The heating/reheating heating circuit 31 is formed in a closed loop form in which the heating/reheating heat exchanger 3->a branch point 310 toward a liquid-liquid heat exchanger 11->a heating bypass passage 311->a cistern 32->a circulation pump 33->the heating/reheating heat exchanger 3 are connected in this order. A water supply pipe 37 is connected to the cistern 32.

Opposite ends 311a, 311b of the heating bypass passage 311 are connected by a high-temperature heating circuit 18 having a high-temperature heating terminal 17 such as a fan convector. A discharge side of the circulation pump 33 is connected to the high-temperature heating circuit 18 via a low-temperature heating circuit 29 having low-temperature heating terminals 19 such as a floor heating mat.

In the vicinity of an upstream end of a bath bypass circuit 16 branching off from the heating/reheating heating circuit 31 and passing through the liquid-liquid heat exchanger 11, a bath reheating valve 36 is disposed. A downstream end of the bath bypass circuit 16 is connected to an upstream side of the cistern 32.

In this hot water heating apparatus 1, if the heating/reheating burner 30 is turned on and the circulation pump 33 is actuated, hot water heated by the heating/reheating heat exchanger 3 circulates through the heating/reheating heating circuit 31 in which the heating/reheating heat exchanger 3->the branch point 310 toward the liquid-liquid heat exchanger 11->the heating bypass passage 311->the cistern 32->the circulation pump 33->the heating/reheating heat exchanger 3 are connected in this order. A part of the hot water circulating through the heating/reheating heating circuit 31 is distributed to the high-temperature heating circuit 18 and the low-temperature heating circuit 29. With this, heating of the room is carried out.

Moreover, the hot water heating apparatus 1 can reheat bath water in a bathtub BT with hot water produced by heating by the heating/reheating heat exchanger 3. For this purpose, the liquid-liquid heat exchanger 11 heated by the bath bypass circuit 16 branching off from the heating/reheating heating circuit 31 is connected to the bathtub BT in a form of a closed loop through a reheating and hot water filling circuit 13, and a forced-circulation pump 12 and a water flow switch 39 are disposed in the reheating and hot water filling circuit 13. In a draining circuit 131 branching off from the reheating and hot water filling circuit 13, a draining valve 132 for preventing freeze is provided.

A connecting circuit 14 for filling hot water in the bathtub BT via the reheating and hot water filling circuit 13 is connected to the hot water heating circuit 21 passing through the hot water heat exchanger 2. A hot water filling valve 15 is provided in a position along the connecting circuit 14.

In the hot water heating apparatus 1, if the burner 20 is turned on and the hot water filling valve 15 is opened, hot water produced by heating by the hot water heat exchanger 2 is supplied in a route of the hot water heating circuit 21->the connecting circuit 14->the hot water filling valve 15->the reheating and hot water filling circuit 13->the bath tub BT to thereby carry out filling of the hot water. By turning on the heating/reheating burner 30, opening the reheating valve 36, and actuating the circulation pump 33 and the forced-circulation pump 12 after filling of the hot water, the liquid-liquid heat exchanger 11 is heated with the hot water flowing through the heating/reheating heating circuit 31 while the bath water circulates through the reheating and hot water filling circuit 13 in which the liquid-liquid heat exchanger 11->the bathtub BT->the forced-circulation pump 12->water flow switch 39->liquid-liquid heat exchanger 11 are connected in this order. With this, reheating of the bathtub BT is carried out.

(Freeze Forecasting Device)

Next, the freeze forecasting device will be described.

Figure 2:
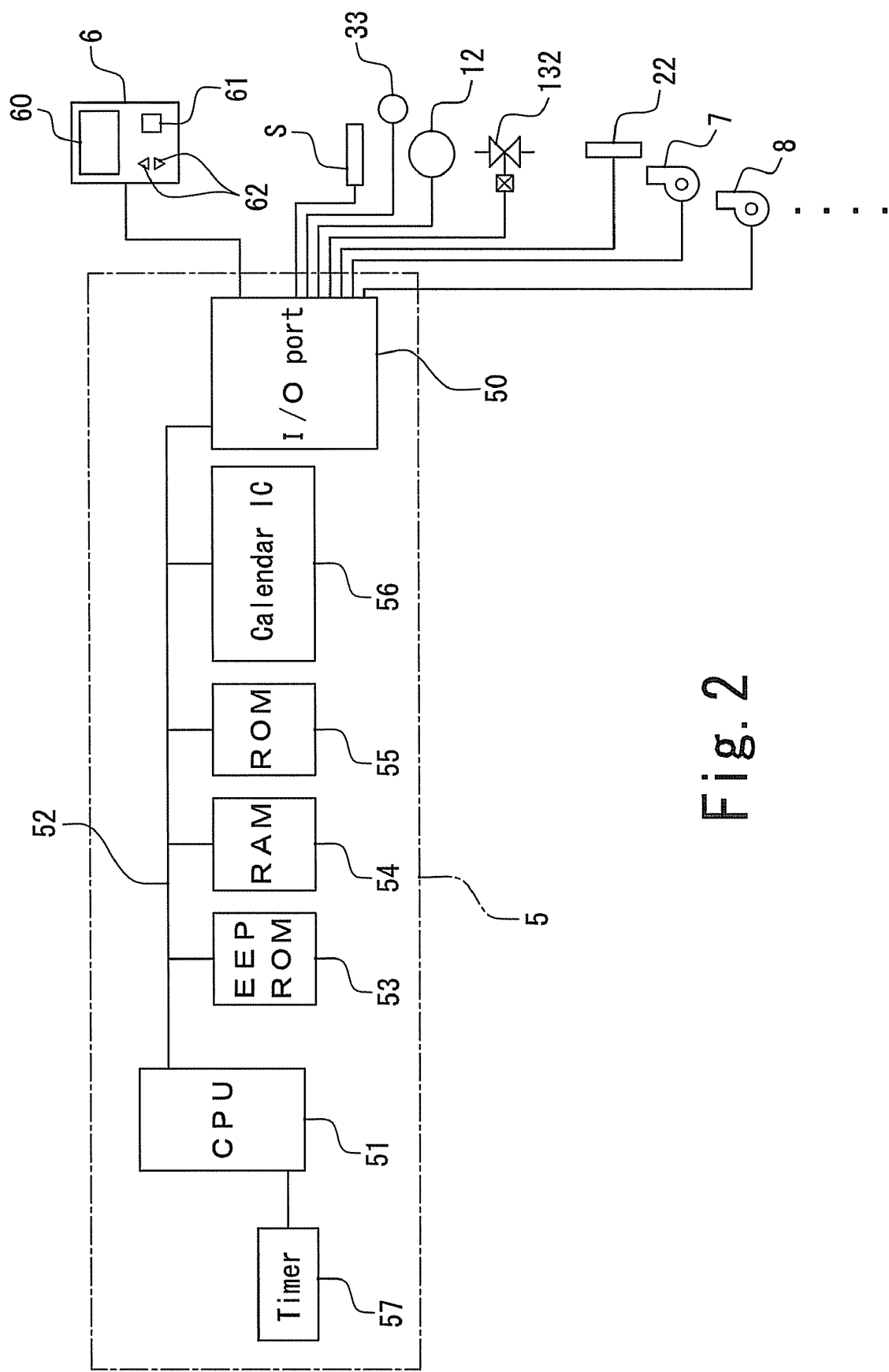
FIG. 2 is a wiring schematic view of a controller, a remote control unit and the like according to the embodiment of the present invention.

As shown in FIG. 2, the freeze forecasting device includes a controller 5, a remote control unit 6 connected to the controller 5 for remote control, and the above-described outside air temperature sensor S. The remote control unit 6 has a function of remotely controlling the hot water heating apparatus 1 and is disposed on a wall face in a kitchen or the like. The remote control unit 6 has a display screen 60 for displaying an operating state and the like, an operation switch 61, and UP/DOWN switches 62 for setting an outgoing temperature, a hot water filling reserved time, and the like.

The controller 5 has not only a function of determining and forecasting the possibility of freeze of water in the water passage circuits such as the reheating and hot water filling circuit 13 and the heating/reheating heating circuit 31 but also a function of controlling operation of the hot water heating apparatus 1. For this purpose, to an input/output port 50 of the controller 5, not only the above-described remote control unit 6 and outside air temperature sensor S but also electrical components such as the circulation pump 33 for heating and reheating, the forced-circulation pump 12, the draining valve 132 for preventing freeze of the reheating and hot water filling circuit 13, the freeze preventing heater 22 for the hot water heating circuit 21, the air supply fans 7, 8 for supplying air for combustion to the burners 20, 30 are connected. In FIG. 2, other electrical components connected to the input/output port 50 are not shown.

The controller 5 comprises a microcomputer in which a CPU 51, an EEPROM 53 as a nonvolatile memory, a RAM 54, a ROM 55, and the input/output port 50 are connected by a bus 52. Moreover, a calendar IC 56 as a clock portion for automatically computing current year, month, day, and time is connected to the bus 52. Furthermore, a timer 57 is connected to the CPU 51.

In this freeze forecasting device, outside air temperature history of the past four years is stored in an outside air temperature table X (J, K) in the EEPROM 53 based on information on the current year, month, day, and time output from the calendar IC 56 and information on the outside air temperature detected by the outside air temperature sensor S as shown in FIG. 3. The outside air temperature table X (J, K) in FIG. 3 is a table formed by dividing four years from 0 o'clock of Jan. 1, 2002 to 0 o'clock of Jan. 1, 2006 into six-hour time zones and storing the minimum outside air temperature (temperature detected by the outside air temperature sensor S) in each time zone for each time zone in the EEPROM 53. The outside air temperature table X (J, K) in FIG. 3 is formed by dividing time into six-hour time zones (e.g., 0 o'clock to 6 o'clock on Jan. 1, 2002, 6 o'clock to 12 o'clock on the same day, 12 o'clock to 18 o'clock on the same day, 18 o'clock on the same day to 0 o'clock on the next day, 0 o'clock to 6 o'clock on the next, . . . 18 o'clock on Dec. 31, 2005 to 0 o'clock on Jan. 1, 2006). In the outside air temperature table X (J, K), year, month, day, and time at the last moment in the time zone is written as reference time X (J, 1) for each time zone and the minimum outside air temperature (minimum temperature detected by the outside air temperature sensor S) X (J, 2) is also written for each time zone.

By utilizing the outside air temperature table X (J, K) in which the history of the outside air temperature is stored, the possibility of freeze of water in the reheating and hot water filling circuit 13, the heating/reheating heating circuit 31, the hot water heating circuit 21, and the like is forecasted in winter season.

Next, a method of making the outside air temperature table X (J, K) in FIG. 3 and a method of forecasting freeze by using the table will be described. In the following, the method of forecasting freeze will be described on an assumption that the hot water heating apparatus 1 is installed and connected to a power source on Dec. 31, 2001.

Figure 4:
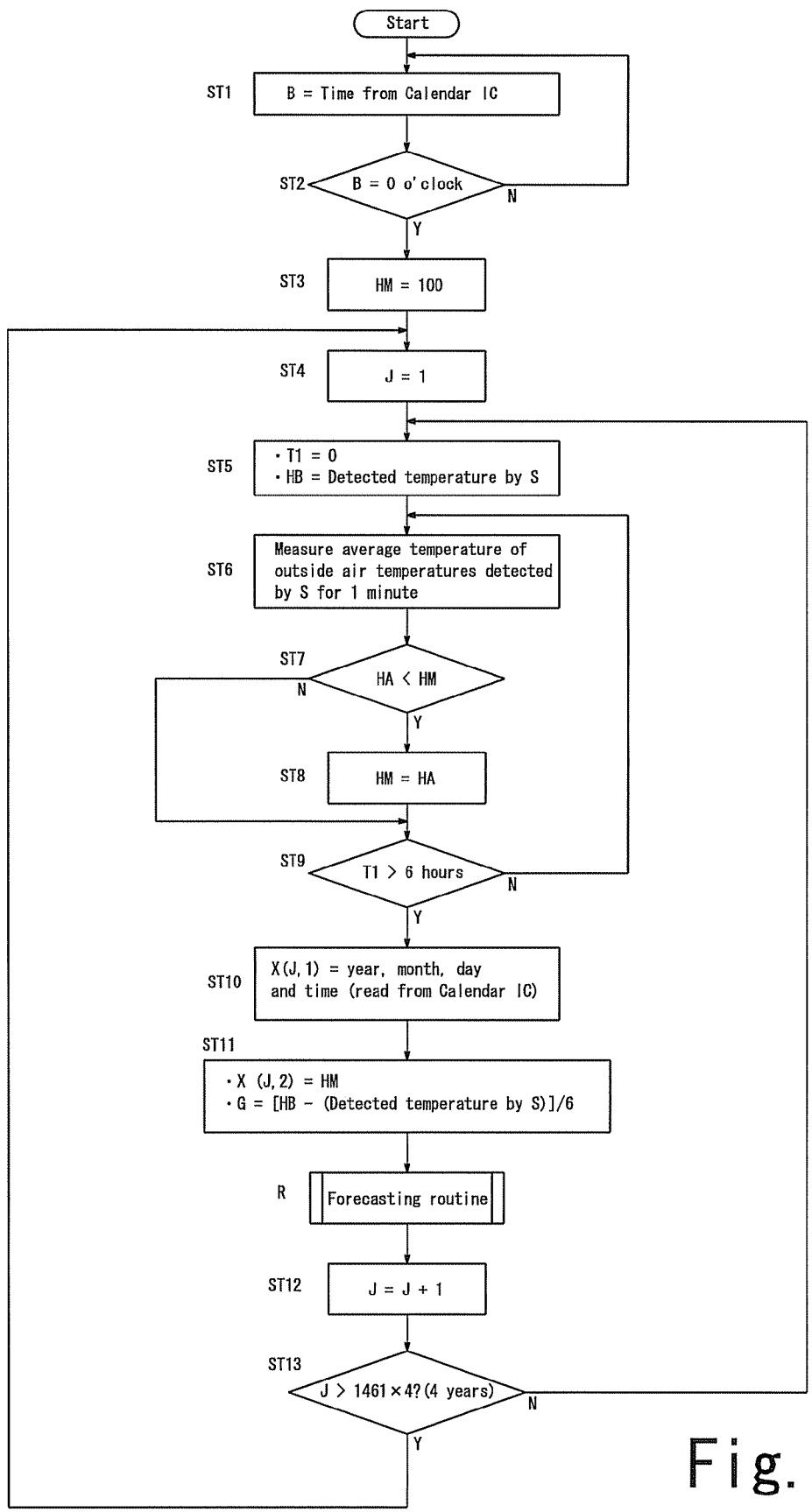
FIG. 4 is a flow chart for explaining operation of a freeze forecasting device according to the embodiment of the present invention.
Figure 5:
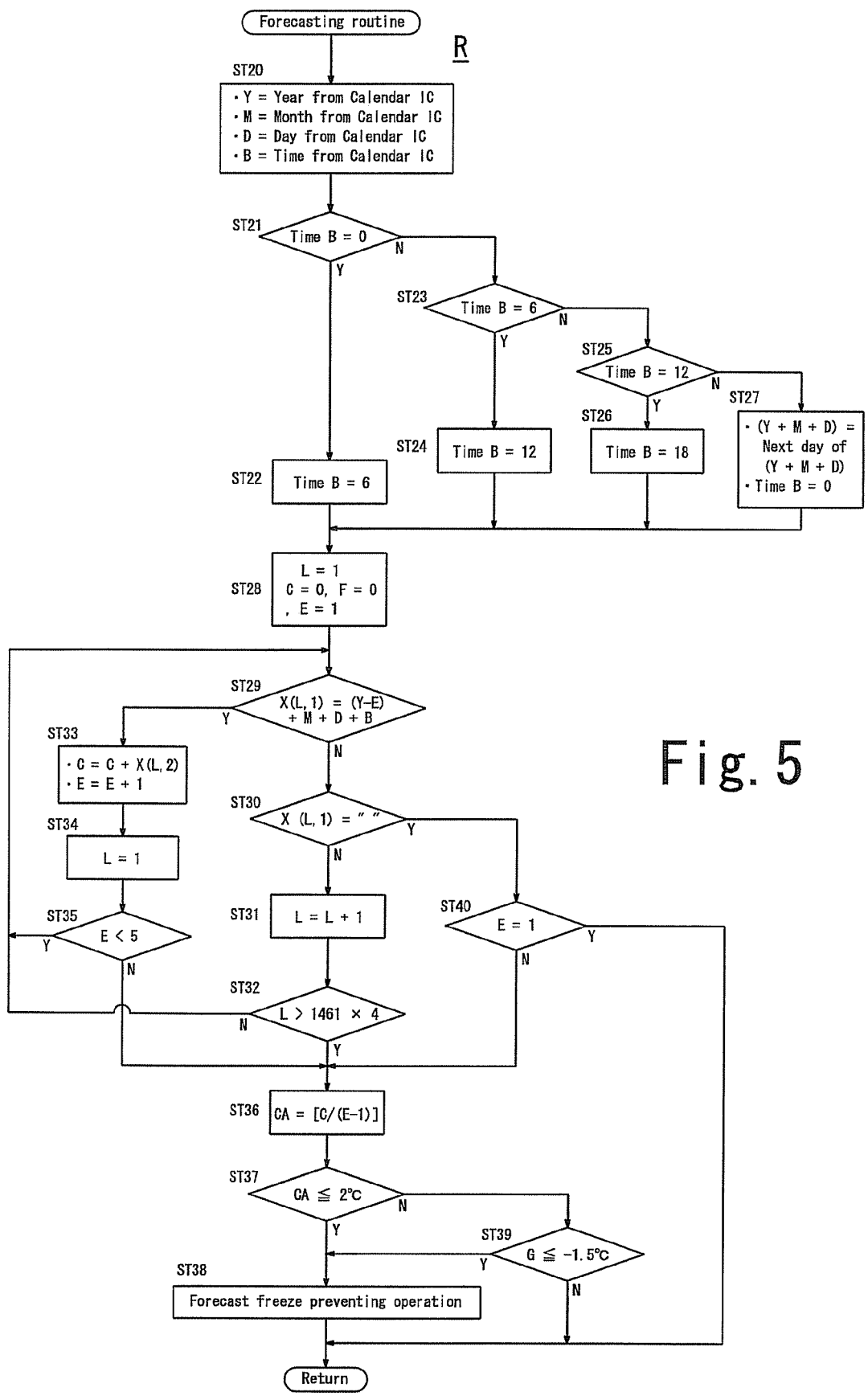
FIG. 5 is a flow chart for explaining the operation of the freeze forecasting device according to the embodiment of the present invention.

FIGS. 4 and 5 are flow charts for explaining a freeze forecasting program stored in the ROM 55 in the controller 5.

First, if the hot water heating apparatus 1 is connected to the power source, current time B is read from the calendar IC 56 in step 1 (ST1) in FIG. 4.

Then, the following processing is waited until the current time B becomes "0 o'clock" in step 2 (ST2).

When the current time B becomes "0 o'clock", a minimum temperature HM for each time zone to be stored as outside air temperature history is initially set to 100° C. in step 3 (ST3) and a variable J is set to "1" in step 4 (ST4).

In step 5 (ST5), a built-in timer T1 in the microcomputer is set to "0" and a temperature detected by the outside air temperature sensor S is stored as an initial temperature HB. This initial temperature HB is used for determination of an outside air temperature gradient as will be described later.

Next, in step 6 (ST6), an average temperature HA of outside air temperatures detected by the outside air temperature sensor S for 1 minute is measured.

If it is determined that the average temperature HA is lower than the minimum temperature HM in step 7 (ST7), the average temperature HA is stored as a new minimum temperature HM in step 8 (ST8). Then, until it is found that measuring time of the built-in timer T1 (set to 0 in step 5 (ST5)) has exceeded six hours in step 9 (ST9), steps 6 (ST6) to 8 (ST8) are repeated. Thus, the minimum temperature HM in the six hours is obtained.

Next, in step 10 (ST10), current year, month, day, and time are read from the calendar IC 56 and are written in a memory portion of the reference time X (J, 1) of the outside air temperature table (FIG. 3). Further, the minimum temperature HM in the six hours obtained in the steps 5 (ST5) to 9 (ST9) is written in the memory portion of the minimum outside air temperature X (J, 2) of the outside air temperature table (see step 11 (ST11)). Moreover, in step 11 (ST11), "an outside air temperature gradient G=[initial temperature HB−(detected temperature by the outside air temperature sensor S)]/6" in the six-hour time zone is determined. In the present embodiment, a function portion of the microcomputer for computing the outside air temperature gradient G based on the detected temperature by the outside air temperature sensor S at a time of execution of the step 4 (ST4) and the step 11 (ST11) corresponds to a temperature change measuring portion.

Next, a forecasting routine R for forecasting the possibility of freeze of water in the water passage circuits such as the reheating and hot water filling circuit 13 and the heating/reheating heating circuit 31 is performed. The forecasting routine R will be described later in detail. The forecasting routine R is performed every time it is found that the built-in timer T1 has finished measuring of six hours in step 9 (ST9). Therefore, the forecasting routine R is performed at each reference time X (J, 1), i.e., 0 o'clock, 6 o'clock, 12 o'clock, and 18 o'clock.

Next, in step 12 (ST12), the value of the variable J is increased by 1. Then, in step 13 (ST13), whether or not the value of the variable J is greater than 1461 (the sum of days for four years)×4(the number of time zones per day=24/6 hours) is determined. If the value of J is not greater than 1461×4, the routine of steps 5 (ST5) to 13 (ST13) is performed again. Thus, the outside air temperatures for respective time zones obtained by dividing one day into six-hour time zones are written for four years in the outside air temperature table X (J, K) in the EEPROM 53. As a result, the outside air temperature table X (J, K) shown in FIG. 3 is completed.

Next, contents of the above-described forecasting routine R will be described in detail referring to FIG. 5.

As described above, the forecasting routine R is performed at respective reference times (X (J, 1)), i.e., 0 o'clock, 6 o'clock, 12 o'clock, and 18 o'clock.

First, in step 20 (ST20), the current year Y, month M, day D, and current time B are read from the calendar IC 56.

If it is determined that the read-in current time B is 0 o'clock in step 21 (ST21), 6 o'clock (the time 6 hours ahead of the current time) is newly stored as an assumed current time B for retrieving the temperature in the forecast target time zone in step 22 (ST22). Similarly, if it is determined that the read-in current time B is 6 o'clock in step 23 (ST23), 12 o'clock is newly stored as the assumed current time B in step 24 (ST24). If it is determined that the read-in current time B is 12 o'clock in step 25 (ST25), 18 o'clock is newly stored as the assumed current time B in step 26 (ST26). Moreover, if the read-in current time B is none of 0 o'clock, six o'clock, and 12 o'clock, year, month, and day of the next day are newly stored as year, month, and day (Y+M+D) (read from the calendar IC 56 in step 20 (ST20)) and 0 o'clock is newly stored as the assumed current time B. In this way, in steps 21 (ST21) to 27 (ST27), the time 6 hours ahead of the current time is newly stored as the current time B for retrieving the temperature in the forecast target time zone. Incidentally, in the present embodiment, year, month, and day (Y, M, D) newly stored in steps 21 (ST21) to 27 (ST27) indicate the forecast target day and the time zone from the newly stored time to the time twelve hours thereafter is the forecast target time zone.

Next, the variable L is set to "1", in step 28 (ST28) and a cumulative outside air temperature C that is the sum (the sum of temperatures for four years) of the past outside air temperatures at respective time points one to four years ago, corresponding to the time point (the time point six hours thereafter) specified by the newly stored year, month, and day (Y+M+D) and current time B, is initially set to "0".

Similarly, a cumulative outside air temperature gradient F that is the sum of the outside air temperature gradients for the four years is initially set to "0". Moreover, the number of years E for data retrieval is initially set to "1".

In step 29 (ST29), year, month, day, and time indicating the reference time X (L, 1) written in the outside air temperature table in FIG. 3 are read. Then, whether or not the read-in year, month, day, and time are year, month, day, and time one to four years ago, corresponding to the newly stored year, month, day, Y, M, D and the current time B (6 hours ahead of the current time point), is determined. For this purpose, whether or not the year written in the reference time X (L, 1) in the outside air temperature table agrees with "the newly stored years Y-E" (one to four years ago) and whether or not the month, day, and time written in the reference time X (L, 1) agree the newly stored M, D, and current time B (6 hours ahead of the current time point) are determined in step 29 (ST29). If both of items of data do not agree with each other as a result of the determination, step 30 (ST30) is further performed. If it is found that data exists at the reference time X (L, 1) in step 30 (ST30), computation of "variable L=L+1" is performed in step 31 (ST31). If it is found that data does not exist at the reference time X (L, 1) in step 30 (ST30) and it is determined that the number of years E for data retrieval is "1" in step 40 (ST40), the control goes out of the forecasting routine in FIG. 5.

On the other hand, if computation of "variable L=L+1" is performed in step 31 (ST31), whether or not the variable L is not greater than "1461×4" (the number of data for four years) is determined in the following step 32 (ST32). If L is not greater than "1461×4", the control returns to step 29 (ST29).

By repeating steps 29 (ST29) to 32 (ST32) in this manner, data in which year written in the reference time X (L, 1) in the outside air temperature table agrees with the "newly stored years Y-E" (one to four years ago) and month, day, and time agree with M, D, and B is retrieved. If both items of data agree with each other, the next computation is performed in step 33 (ST33). In other words, the computation for obtaining the cumulative outside air temperature C that is the sum of the past outside air temperatures (the sum of the temperatures for four years) at each time point one to four years ago, corresponding to the time point (the time point 6 hours ahead of the current time) specified by the newly stored year, month, day (Y+M+D) and the current time B, is performed. Moreover, computation for updating the number of years E for data retrieval is performed. Specifically, the computation of "the cumulative outside air temperature C=C+X (L, 2)" and computation of "the number of years E for data retrieval=E+1" are performed.

Then, the variable L is newly set to "1" in step 34 (ST34) to return to a state in which the data can be searched for from the top of the outside air temperature table X (J, K). Then, if it is determined that the number of years E for data retrieval is less than 5 in step 35 (ST35), the control returns to step 22 (ST22).

By repeating steps 29 (ST29) to 35 (ST35) in this manner, the computation for obtaining the cumulative outside air temperature C that is the sum of the past outside air temperatures at the time point one to four years ago, corresponding to the time point specified by the newly stored year, month, and day (Y+M+D) and the current time B, is performed. Then, if retrieval of all items of data in the outside air temperature table in FIG. 3 has finished (step 32 (ST32)) or if the number of years E for data retrieval is not 1, though no more data exists halfway through the retrieval (step 30 (ST30) and step 40 (ST40)), computation of "past average outside air temperature CA=cumulative outside air temperature C/(E−1)" is performed in step 36 (ST36).

Next, if it is determined that the past average outside air temperature CA is not higher than the freezing critical temperature, for example 2° C., in step 37 (ST37), a forecast that water in the water passage circuits such as the reheating and hot water filling circuit 13 and the heating/reheating heating circuit 31 may freeze (forecast of the freeze preventing operation) is announced by sound through a speaker (not shown) provided in the remote control unit 6 and displayed on the display screen 60 at the same time in step 38 (ST38).

On the other hand, if it is determined that the past average outside air temperature CA is higher than the freezing critical temperature, for example 2° C., in step 37 (ST37), step 39 (ST39) is further performed. In step 39 (ST39), if it is determined that an actual outside air temperature gradient G at the current time point (obtained in step 11 (ST11) in FIG. 4) is greater than −1.5° C./hr, for example, indicating a possibility of freezing at the forecast target time, the fear of freeze of water in the water passage circuits such as the reheating and hot water filling circuit 13 and the heating/reheating heating circuit 31 is forecasted in step 38 (ST38). In other words, determination of whether or not the forecast is necessary is corrected based on magnitude of the change in current outside air temperature (when reduction in the outside air temperature change indicates the possibility of freeze). If the reduction in the actual outside air temperature change of the forecast target day indicates the possibility of freeze, the fear of freeze is forecasted even if the past average outside air temperature CA is higher than the freezing critical temperature. If the past average outside air temperature CA is not higher than the freezing critical temperature and the change in actual outside air temperature at the current time point does not indicate the possibility of freeze, the fear of freeze may be forecasted by giving the past outside air temperature priority over the change in actual outside air temperature or the forecast determination may be corrected to determine that the forecast is unnecessary.

Figure 6:
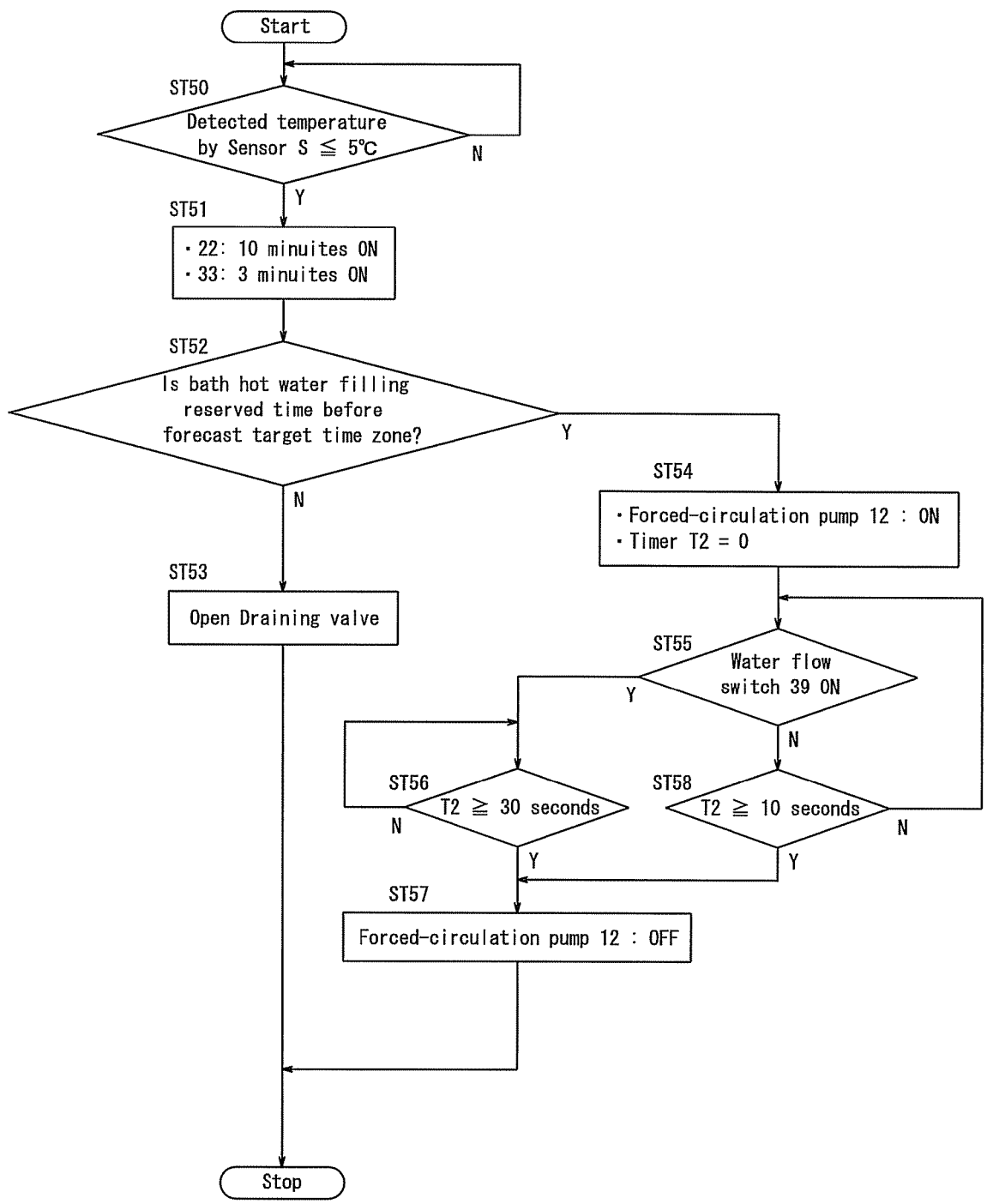
FIG. 6 is a flow chart for explaining freeze preventing operation of the hot water heating apparatus according to the embodiment of the present invention.

FIG. 6 is a flow chart for explaining a program for the freeze preventing operation of the hot water heating apparatus 1 and stored in the ROM 55 in the controller 5.

Upon performing the freeze preventing operation of the hot water heating apparatus 1, if it is determined that the outside air temperature detected by the outside air temperature sensor S is not higher than 5° C. in step 50 (ST50), the freezing preventing heater 22 is caused to generate heat for ten minutes to heat the hot water heating circuit 21 and the circulation pump 33 is actuated for three minutes to circulate water in the heating/reheating heating circuit 31 in step 51 (ST51). As a result, freeze of water in the hot water heating circuit 21 and the heating/reheating heating circuit 31 is prevented. In this case, if there is the fear of freeze of water in the water passage circuits such as the heating/reheating heating circuit 31, the forecast of the fear of freeze is announced in advance through the speaker (not shown) or the like provided in the remote control unit 6 as described above (see step 38 (ST38) in FIG. 5). Therefore, a resident does not suffer from a feeling of suddenness even if noise of operation of the circulation pump 33 occurs.

Next, in step 52 (ST52), whether or not the bath hot water filling reserved time (assumed to be set by the remote control unit 6) is before the forecast target time zone is determined. If the hot water filling reserved time is after the forecast target time zone, step 53 (ST53) is performed to open the draining valve 132 of the draining circuit 131 branching off from the reheating and hot water filling circuit 13. Namely, when the hot water filling reserved time is after the forecast target time zone, there is a high possibility of freeze of water in the reheating and hot water filling circuit 13 during the forecast target time zone. Therefore, if water is drained by opening the draining valve 132, freeze of the reheating and hot water filling circuit 13 is prevented. On the other hand, if the hot water filling reserved time is before the forecast target time zone in step 52 (ST52), the forced-circulation pump 12 is actuated and the built-in timer T2 in the microcomputer is set to 0 in step 54 (ST54). Then, if it is found that the water flow switch 39 detects a flow of water to output an ON signal in step 55 (ST55), a wait of 30 seconds is carried out in step 56 (ST56). Then, in step 57 (ST57), the forced-circulation pump 12 is stopped. As a result, the bath water in the bathtub BT is forcibly circulated by the forced-circulation pump 12 to thereby prevent freeze.

On the other hand, if the water flow switch 39 does not sense a flow of water for 10 seconds, it is determined that there is no bath water in the reheating and hot water filling circuit 13 and the forced-circulation pump 12 is stopped (step 55 (ST55), step 58 (ST58), and step 57 (ST57)).

Other Embodiments i) In the above embodiment, the outside air temperature in the same time zone as the forecast target time zone of past year, month, and day corresponding to year, month, and day of the forecast target day is retrieved from the outside air temperature table X (J, K). However, outside air temperatures in the same time zones as the forecast target time zone of past year, month, and days corresponding to days (few days) before and after year, month, and day of the forecast target day may be retrieved from the outside air temperature table X (J, K) and a possibility of freeze of water based on the retrieved outside air temperatures may be forecasted.

ii) Although the year Y, month M, and day D and the current time B are read from the calendar IC 56 in step 20 (ST20) in FIG. 5 in the above embodiment, they may be set manually by means of the UP/DOWN switches 62 or the like provided in the remote control unit 6.

Moreover, the year, month, day, and time newly set in steps 20 (ST20) to 27 (ST27) may be set manually. In other words, the forecast target day, the forecast target time zone, and the like may be set manually. In this case, the UP/DOWN switches 62 or the like for setting the year Y, month M, day D, and the current time B correspond to a time and date setting portion.

iii) The ON time of the freeze preventing heater 22 ON/OFF controlled for preventing freeze of water in the hot water heating circuit 21 may be set to be longer when the heating/reheating burner 30 is in an ON state than in an OFF state.

In other words, because heating by the high-temperature heating terminal 17 or the low-temperature heating terminal 19 is continued for long time in winter, the heating/reheating burner 30 burns for long time during shutdown of the hot water heat exchanger 2. In this case, cold outside air supplied to the heating/reheating burner 30 by actuation of the air supply fan 8 cools the hot water heating circuit 21 of the hot water heat exchanger 2 in a vicinity of the burner 30 and therefore water in the hot water heating circuit 21 becomes liable to freeze. Consequently, if the ON time of the freeze preventing heater 22 is set to be longer in the ON state of the heating/reheating burner 30 than in the OFF state, freeze of the water in the hot water heating circuit 21 is prevented reliably. Moreover, in the OFF state of the heating/reheating burner 30 in which the water in the hot water heating circuit 21 is less liable to freeze, power consumption of the freeze preventing heater 22 can be suppressed. Therefore, it is possible to effectively utilize the electric power.

iv) In the above embodiment, the average temperature of the outside air temperatures in the past few years is obtained for the same time zone as the forecast target time zone of the past year, month, and day corresponding to the year, month, and day of the forecast target day (see step 36 (ST36) in FIG. 5). If the average temperature is not higher than the freezing critical temperature (for example, 2° C.), the freeze preventing operation is forecasted (see step 37 (ST37) and step 38 (ST38) in FIG. 5). However, the freeze preventing operation may be forecasted also in a case where at least one of the past outside air temperatures in the same time zones as the forecast target time zone of the year, month, and day in the past few years is not higher than the freezing critical temperature (e.g., not higher than 2° C.).

v) Although one day is divided into six-hour time zones and the past outside air temperatures for respective time zones are stored in the EEPROM 53 in the above embodiment, one day does not necessarily have to be divided into six-hour time zones. For example, an outside air temperature for each shorter-hour time zone or for every instant may be stored in the EEPROM 53. Then, by using the past outside air temperatures stored in the EEPROM 53, the possibility of freeze may be forecasted similarly to the above embodiment.

As described in detail above, according to one aspect of the present invention, there is provided a freeze forecasting device for a hot water heating apparatus, for forecasting a possibility of freeze of water in a water passage circuit due to reduction in outside air temperature at a forecast target time on a forecast target day, the device comprising:

a clock portion for automatically computing current year, month, day, and time;

an outside air temperature sensor;

an outside air temperature history storage portion for storing outside air temperatures for at least one year based on outputs from the clock portion and the outside air temperature sensor;

a retrieval portion for retrieving a past outside air temperature in a time zone including a time identical to the forecast target time in a past year, month, and day corresponding to the year, month, and day of the forecast target day or a day before or after the forecast target day, from the outside air temperature history storage portion; and a forecasting portion for determining whether the retrieved past outside air temperature is not higher than a freezing critical temperature of the water in the water passage circuit and forecasting the possibility of freeze of the water in the water passage circuit at the forecast target time on the forecast target day.

According to the freeze forecasting device above, the outside air temperatures for at least one year based on outputs from the clock portion and the outside air temperature sensor are stored in the outside air temperature history storage portion. For forecasting a possibility of freeze of water, the outside air temperature at the forecast target time on the forecast target day is retrieved from the past outside air temperatures stored in the outside air temperature history storage portion. Specifically, the outside air temperature in the same time zone as the forecast target time zone of past year, month, and day corresponding to year, month, and day of the forecast target day or the day before or after the forecast target day (few days) is retrieved from the outside air temperature history storage portion. When the retrieved past outside air temperature is not higher than a freezing critical temperature of the water, the possibility of freeze of the water is forecasted.

Namely, according to the freeze forecasting device above, the past outside air temperature of a time zone including a time identical to the forecast target time in the past year, month, and day corresponding to the year, month, and day of the forecast day or the day before or after the forecast target day (few days), is retrieved from the outside air temperature history storage portion, and the possibility of freeze of water is forecasted based on the retrieved past outside air temperature. Accordingly, as the fear of freeze is forecasted in advance, a resident does not suffer from a feeling of suddenness even if noise for preventing freeze occurs.

The freeze forecasting device above may further include a temperature change measuring portion for measuring change in outside air temperature on the forecast target day before the forecast target time, wherein the forecasting portion may correct determination of the forecast based on magnitude of the measured change in outside air temperature.

According to the freeze forecasting device above, it is possible to further improve accuracy of the forecast.

In the freeze forecasting device above, the forecast target day and the forecast target time may be day and time after a set time passes from the current year, month, day, and time output from the clock portion.

According to the freeze forecasting device above, a current time automatically output from the clock portion is set as the forecast target time. Therefore, it is not necessary to set the forecast target time manually.

The freeze forecasting device above may further include a temperature change measuring portion for measuring change in outside air temperature on the forecast target day before the forecast target time, wherein the forecasting portion may determine whether the retrieved past outside air temperature is not higher than the freezing critical temperature of the water in the water passage circuit and may forecast the possibility of freeze of the water in the water passage circuit at the forecast target time on the forecast target day when the retrieved past outside air temperature is not higher than the freezing critical temperature of the water in the water passage circuit or when reduction in the measured outside air temperature change on the forecast target day indicates a high possibility of freeze of water though the retrieved past outside air temperature is higher than the freezing critical temperature of the water in the water passage circuit.

According to the freeze forecasting device above, determination of whether or not the forecast is necessary is corrected based on magnitude of the change in current outside air temperature (when reduction in the outside air temperature change indicates the possibility of freeze). If the reduction in the outside air temperature change indicates the possibility of freeze, the fear of freeze is forecasted even if the past average outside air temperature is higher than the freezing critical temperature. Therefore, it is possible to forecast the possibility of freeze certainly.

The freeze forecasting device above may further include a time and date setting portion for manually inputting the forecast target day and the forecast target time.

According to the freeze forecasting device above, it is possible to forecast the possibility of freeze at the forecast target time on the forecast target day input by hand.

According to another aspect of the present invention, there is provided a hot water heating apparatus including the freeze forecasting device.

According to the hot water heating apparatus above, a resident does not suffer from a feeling of suddenness even if noise for preventing freeze occurs.

The hot water heating apparatus above may further include a draining valve in a draining circuit branching off from the water passage circuit, wherein the draining valve may be opened when the possibility of freeze of the water in the water passage circuit is forecasted.

According to the hot water heating apparatus above, water in the water passage circuit is drained after the forecast of freeze. Therefore, the resident can recognize that the noise is caused by draining water based on operation for preventing freeze.

The hot water heating apparatus above may further include a forced-circulation pump, wherein the draining valve in the draining circuit may be opened when a bath hot water filling reserved time is after the forecast target time, and the forced-circulation pump may be actuated to circulate water forcibly when the hot water filling reserved time is before the forecast target time.

According to the hot water heating apparatus above, freeze of water of the reheating and hot water filling circuit is certainly prevented.

The hot water heating apparatus above may further include a freeze preventing heater and a heating/reheating burner, wherein an ON time of the freeze preventing heater may be longer in an ON state of the heating/reheating burner than in the OFF state.

According to the hot water heating apparatus above, not only can freeze of the water in the hot water heating circuit be prevented reliably but also the power consumption of the freeze preventing heater can be suppressed.

The present application claims priority based on a Japanese Patent Application No. 2006-212857 filed on Aug. 4, 2006, the content of which is hereby incorporated by reference in its entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

The invention claimed is:

1. A freeze forecasting device for a hot water heating apparatus, for forecasting a possibility of freeze of water in a water passage circuit due to reduction in outside air temperature at a forecast target time on a forecast target day, the device comprising:

a clock portion for automatically computing current year, month, day, and time;

an outside air temperature sensor;

an outside air temperature history storage portion for storing outside air temperatures for at least one year based on outputs from the clock portion and the outside air temperature sensor;

a retrieval portion for retrieving a past outside air temperature in a time zone including a time identical to the forecast target time in a past year, month, and day corresponding to the year, month, and day of the forecast target day or a day before or after the forecast target day, from the outside air temperature history storage portion; and a forecasting portion for determining whether the retrieved past outside air temperature is not higher than a freezing critical temperature of the water in the water passage circuit and forecasting the possibility of freeze of the water in the water passage circuit at the forecast target time on the forecast target day.

2. The freeze forecasting device according to claim 1, further comprising a temperature change measuring portion for measuring change in outside air temperature on the forecast target day before the forecast target time, wherein the forecasting portion corrects determination of the forecast based on magnitude of the measured change in outside air temperature.

3. The freeze forecasting device according to claim 1, wherein the forecast target day and the forecast target time are day and time after a set time passes from the current year, month, day, and time output from the clock portion.

4. The freeze forecasting device according to claim 1, further comprising a temperature change measuring portion for measuring change in outside air temperature on the forecast target day before the forecast target time, wherein the forecasting portion determines whether the retrieved past outside air temperature is not higher than the freezing critical temperature of the water in the water passage circuit, and forecasts the possibility of freeze of the water in the water passage circuit at the forecast target time on the forecast target day when the retrieved past outside air temperature is not higher than the freezing critical temperature of the water in the water passage circuit or when reduction in the measured outside air temperature change on the forecast target day indicates a high possibility of freeze of the water though the retrieved past outside air temperature is higher than the freezing critical temperature of the water in the water passage circuit.

5. The freeze forecasting device according to claim 1 further comprising a time and date setting portion for manually inputting the forecast target day and the forecast target time.

6. A hot water heating apparatus comprising the freeze forecasting device according to claim 1.

7. The hot water heating apparatus according to claim 6, further comprising a draining valve in a draining circuit branching off from the water passage circuit, wherein the draining valve is opened when the possibility of freeze of the water in the water passage circuit is forecasted.

8. The hot water heating apparatus according to claim 7, further comprising a forced-circulation pump, wherein the draining valve in the draining circuit is opened when a bath hot water filling reserved time is after the forecast target time, and the forced-circulation pump is actuated to circulate water forcibly when the hot water filling reserved time is before the forecast target time.

9. The hot water heating apparatus according to claim 6, further comprising a freeze preventing heater and a heating/reheating burner, wherein an ON time of the freeze preventing heater is longer in an ON state of the heating/reheating burner than in the OFF state.

\* \* \* \* \*